April 7, 1953  L. F. O'BRIEN  2,634,154
HAY SLING
Filed July 14, 1949  2 SHEETS—SHEET 2
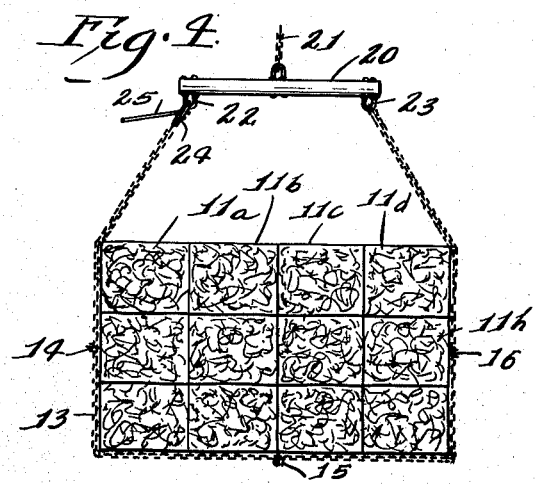
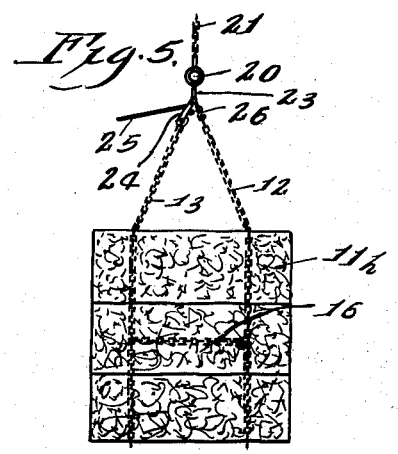
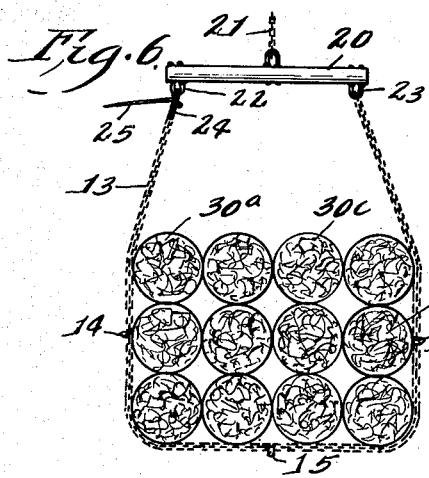
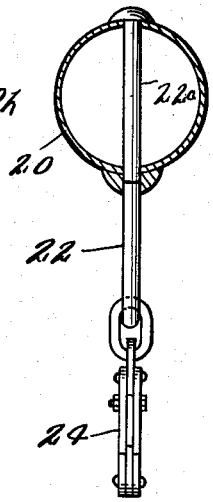
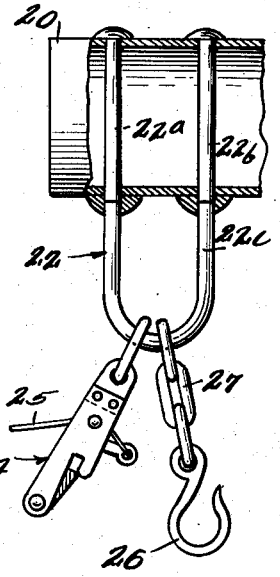
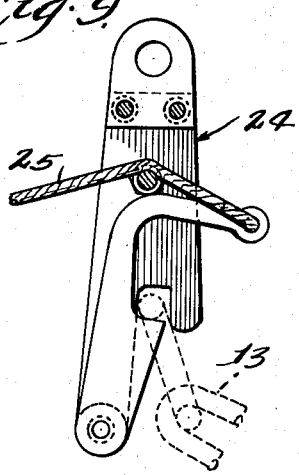
Inventor:
Lee F. O'Brien
Schroeder Merriam
By Hofgren & Brady
Attorneys

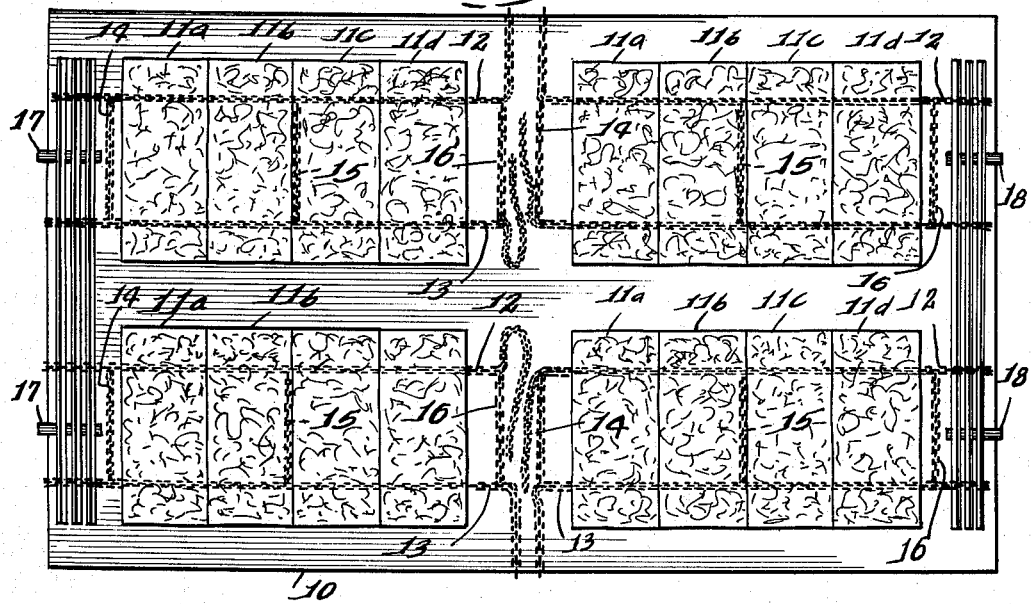
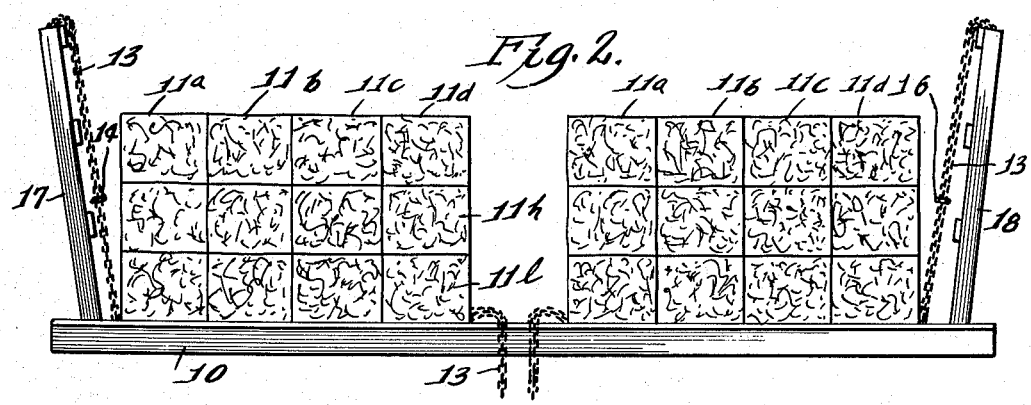
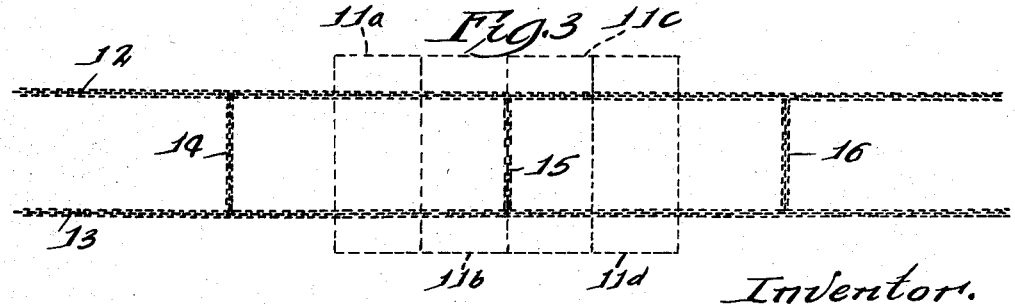

UNITED STATES PATENT OFFICE 2,634,154

HAY SLING

Lee F. O'Brien, Batavia, Ill.

Application July 14, 1949, Serial No. 104,612

6 Claims. (Cl. 294—75)

This invention relates to a hay sling, and more particularly to a sling for hoisting a stack of bales of baled hay to a desired height and removing them to, and releasing them at, a desired location in such manner that strain or shock on the supporting floor receiving the bales is minimized.

In hay slings known and in use prior to my inventions, actuation of the release mechanism or tripping mechanism drop all of the bales substantially simultaneously and substantially in a single spot, resulting in shock on the hayloft floor or other place of deposit which was very undesirable and sometimes resulted in damage. In my Patent No. 2,431,194, issued November 18, 1947, I disclosed and claimed a type of hay sling which operated to give a "fanning" or wider distribution of bales at the time of the release in order to minimize the shock and avoid localization of bale impact.

My present inventions here being disclosed and claimed constitute improvements not only over the prior art but also over the type of sling shown in my above mentioned Patent No. 2,431,194, the sling here disclosed being a carrying forward and further improvement of the basic inventions shown in my earlier patent.

One feature or improvement of the present sling is the use of a lifting beam which is substantially shorter than the length of the stack of bales being lifted. This results in the chains or other flexible members pulling in tightly on the end bales of the top row of the stack providing a better and more stable grip during hoisting and movement of the stack of bales. The considerable inward force or grip thus provided at each end of the top row of bales, particularly in conjunction with the relocation of the release mechanism, as hereinafter described, provides a "buckling" action of the bales when the release mechanism is actuated, increasing the "fanning" or spreading of the bales upon their discharge from the sling. The tight grip on the top row also slows down the movement of the bales out of the stack when the release mechanism is operated, so that there is not only the wider distribution of bales but also a greater time interval between the time the first bale strikes the hayloft floor and the time the last part of the load strikes it.

Another improvement or feature of the sling being here disclosed is the location of the releasing mechanism immediately under and closely adjacent the lifting beam. In conjunction with the use of the short beam, as mentioned immediately above, this improves the discharge operation of the sling. In addition, it very greatly facilitates handling of the chains or other flexible members, enabling the final connections to the lifting beam to be made much more conveniently than has heretofore been possible with my sling. This is particularly true in connection with round bales, which have heretofore presented great difficulty in handling with any sling.

Another feature or improvement hereby first disclosed is the use of long chains or flexible bottom members of such length that they extend not only up the ends of the stack but also thereabove to a point immediately beneath the beam. This facilitates connection and handling in a manner which will become more fully apparent hereafter, particularly where round bales are being handled. In addition to lengthening the flexible bottom members, I have found it desirable, particularly with a releasing mechanism at or immediately under the lifting beam to provide cross-pieces at the ends of the stack, at least part way up such ends, as this minimizes "whipping" of the one chain or flexible member upon operation of the releasing mechanism.

Other features and advantages of this invention will be apparent from the following specification and the drawings in which:

Figure 1 is a top plan view of the surface of a hayrack or wagon with four stacks of baled hay thereon, each stack having a pair of bottom sling members thereunder; Figure 2 is a side elevation of the bed of the hay wagon looking from the bottom of Figure 1; Figure 3 is a separate view of one pair of spaced apart bottom members and their interconnecting flexible cross-members, the relative location of a stack of bales of hay thereon being indicated in dotted lines; Figure 4 is a side elevation of a stack of bales of hay being lifted by the sling; Figure 5 is an end elevation of the bales as shown in Figure 4, looking from the left of such figure; Figure 6 is a side elevational view of a stack of round bales of hay being lifted by my sling; Figure 7 is an enlarged fragmentary elevational view of the lifting beam and associated lifting mechanism looking at the left of Figure 4; Figure 8 is an enlarged detailed view of the same end of the lifting beam partly in section; and Figure 9 is a side elevational view of the releasing mechanism.

Referring now to the particular embodiment of my inventions as illustrated in the accompanying drawing, the general construction, arrangement and operation of my improved hay sling will be described. However, since the general operation of such a sling has been described fully in my above mentioned Patent No. 2,431,194, the present description will be concerned particularly with those features and differences which constitute improvements and reference may be had to my earlier patent, if desired, to supplement the present disclosure.

Inasmuch as the four stacks of bales of hay and the four sets of bottom members or sling members shown on the bed 10 of the hayrack in Figures 1 and 2 are identical, only one will be described in detail, it being understood that the others are similar. Referring now to the stack or pile of bales of hay 11 forming one of the stacks on the bed of a hayrack, it will be seen that these are here illustrated as rectangular bales. In practice, such bales have dimensions which are generally in the neighborhood of 14" x 18", with a length normally between 36" and 44". A stack comprising three rows of four each, which I find most convenient and have illustrated here, thereby comprises a stack about 6 feet long by from 3 to 3¾ feet wide by about 3½ feet high.

Beneath such a stack, having been placed there before the bales are placed on the wagon bed, is a sling arrangement here shown as comprising a pair of spaced apart flexible members 12 and 13 interconnected by flexible cross-members 14, 15 and 16. These flexible members are preferably chains although it will be understood that they may also be of rope, cable, or the like. While I find it satisfactory to use the cross-members in their flexible condition, they may also be covered with hose or tubing as illustrated in my earlier patent. Merely as representative dimensions and with no intention of any limitations with respect to dimensions I may state that I have found it desirable to use flexible members 12 and 13 of a length of about 17 feet and with a spacing of about 2 feet with stacks of bales of hay of the character just illustrated and described, and to place one flexible cross-member in the center and the others about 3 feet to 3½ feet in from each end.

Having the bottom members of such length proves advantageous when the rack is being loaded. Referring more particularly to Figures 1 and 2, it will be seen that the outermost ends of the pairs of flexible members may be thrown up over the ladders at each end of the bed, as the ladders 17 and 18, in which position they will remain while the bales are being loaded. Moreover, the flexible members toward the side edges of the bed of the hayrack may be permitted to drag over the side as may be best seen in Figure 2, where such ends will be readily accessible when it is desired to hook onto the lifting beam. The only ends which are the less accessible are those toward the center of the bed of the wagon and difficulty in reaching these ends when the wagon is to be unloaded may be avoided, if desired, by drawing these up over each row of bales as additional rows of bales are placed on each stack. This latter method of handling the members is practically a necessity in the case of round bales, which otherwise roll toward each other in such a way as to make it very difficult to get to the ends of the flexible members. However, by drawing the outer ends of these members up over each succeeding row as the round bales are loaded, all ends are readily available for hooking onto the lifting beam when the wagon is driven into the barn and the bales are to be hoisted.

Referring now more particularly to Figures 4 and 5, the completed hay sling or hoist is illustrated. When the wagon has been driven into the barn or other place of unloading, the lifting beam 20 is lowered by the hoisting cable 21 to a position closely adjacent the top of the stack or pile of bales, or even lying on top of the stack to be lifted, and the ends of the flexible members 12 and 13 are then hooked onto connecting means provided for this purpose.

As may be best seen in Figures 7 and 8, I prefer to use a metal tube or pipe for the lifting beam 20, and at each end I provide a yoke member, these being here identified as 22 and 23. As a matter of manufacturing cheapness, these yoke members may be formed of separated parts welded together in assembly, as is best seen in Figure 8. That is, the parts 22a and 22b may be inserted from the top of the beam through openings provided for that purpose and welded at their lower ends to the U-shaped portion 22c. It will be also understood that any other form providing a welded or threaded attachment may be used, just so that there is an eyelet or the like at each end of the lifting beam providing a support for the connecting means. The connecting means at one end of the beam, as may be best seen in Figure 8, comprises a releasing mechanism or tripping mechanism indicated in general as 24, adapted to be manually operated by a tripping or releasing line 25 controlled by the operator; and a hook 26 preferably connected to the U-shaped member 22 by several chain lengths 27 in order to make the point of connection with a flexible bottom member of the sling at approximately the same distance from the beam. As may be best seen in Figure 9, the releasing mechanism is of a character such that a link at the end of the flexible bottom member 13 may be held as long as desired but will be released upon manual operation of the tripping line 25. Since such a releasing was more fully illustrated and described in my earlier patent, it will not be further described here and reference may be made to the earlier patent to supplement the present disclosure. It will also be understood that any suitable type of releasing mechanism may be used in place of the particular one illustrated. The other three connections are made by relatively deep hooks as the hook 26, in such manner that they are manually non-releasable during lifting and holding of the load, as was also the case in the sling disclosed in my earlier patent.

Referring now again more particularly to Figures 4 and 5, when the connections have been made and the hoisting arrangement started, the hoisting line 21 lifts the beam until the flexible sling members tighten and pick up the load, the situation then being as illustrated in these two figures. I find it preferable to make the length of the lifting beam very much shorter than the length of the stack of bales being lifted so that the chains or flexible members bind inwardly over the top corners of the stack, extending in at an angle of 30° or 40° to the vertical as illustrated. With a stack of the general character heretofore described, having a length of about 6 feet, I find it preferable to make the length of the beam (i. e., the effective length from U-bolt to U-bolt) between one-half and three-quarters of the length of the stack, a very satisfactory beam length in this regard having proved to be about 40 inches. Having the flexible sling members bind inwardly over the ends of the stack not only stabilizes the hold on the stack, avoiding any possibility of loss of a bale upon accidental collision with a rafter or the like, but also has very advantageous features in connection with the discharge of the bales. By having the beam length shorter than the stack length and the releasing mechanism at or near the beam, the one-corner-only release which was a feature of my earlier patent, is still further improved. This arrangement causes an accentuated buckling of the stack upon release with a wider distribution or "fanning" of the bales, together with a frictional retardation of bale movement such that the total discharge time is increased and the bales do not strike the loft floor or other place of storage as close together as was even the case with my previous sling.

In order to minimize "whipping" of that end of the flexible member which is connected to the releasing mechanism and released upon tripping thereof, I have found it desirable to have one of the flexible cross-members, as the member 14 illustrated in Figure 5, up the end of the stack of bales rather than having all of such cross-members beneath the stack of bales. However, in order to get the best discharge action, the cross-member must not be further up above the bottom of the stack than its own length. That is, with a cross-member of a length of about 2 feet, it should preferably be located up from the bottom of the stack only about 1½ feet or 1¾ feet so that when the one of the pair of parallel bottom members is released, all support for the one corner of the stack will drop away.

Referring now more particularly to Figure 6, the same sling illustrated and described heretofore is shown handling a stack of circular bales of hay here identified as 30. While rectangular bales are still by far the most common forms, cylindrical bales are coming into some usage. Those most commonly encountered today have a length of the same order as the rectangular bales, and a diameter generally of the order of 12 to 15 inches, although it is understood that my device is in no way limited to bales of any particular size. With circular bales, the stacks if made in three rows of four as illustrated in Figure 6, will only have a length of from 4 to 5 feet, so that the inward angle of the upper portions of the flexible sling members is not as great as with a longer stack. However, the inward angle is still sufficient with a 40 inch beam to provide considerable inward grip or binding action on the top row of bales and to achieve the advantages described in connection with the stack of bales previously referred to. Moreover, my sling is about the only satisfactory sling which can handle round bales of hay without the necessity for reloading or shifting them at the point where they are to be hoisted. By throwing one pair of ends of the flexible members over the ladders at each end of the bed of the hayrack, as previously described, and by throwing the other ends up over each row as the round bales are loaded, connection to the beam may be readily made at the point of hoisting and even if the stack has shifted out of position the sling will properly lift the stack of round bales, enabling it to be hoisted up, run down the track way to a desired point, and discharged in the same manner as with the stack of rectangular bales.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. A sling for baled hay and the like, including: a pair of spaced apart flexible bottom members adapted to have bales of hay and the like stacked thereon in a generally rectangular stack of a particular predetermined size; a rigid lifting beam extending parallel to said bottom members and being substantially shorter than the length of the stack it is adapted to accommodate; and means for connecting said bottom members and the ends of said beam, one connection to one end of one bottom member including a manually operable releasing mechanism and the other connections being held against manual release during lifting of the load, whereby operation of said releasing mechanism causes a relatively slow discharge and a spreading of the load.

2. A sling for baled hay and the ilke, including: a pair of spaced apart flexible bottom members adapted to have bales of hay and the like stacked thereon in a generally rectangular stack of a length about equal to the width of four bales of hay; a rigid lifting beam extending parallel to said bottom members and having a length only slightly over half that of the stack; and means for connecting said bottom members and the ends of said beam, one connection to one end of one bottom member including a manually operable releasing mechanism and the other connections being held against manual release during lifting of the load, whereby operation of said releasing mechanism causes a relatively slow discharge and a spreading of the load.

3. A sling for baled hay and the like, including: a pair of spaced apart flexible bottom members adapted to have bales of hay and the like stacked thereon in a generally rectangular stack, said bottom members having a length more than twice that of the stack; a rigid lifting beam extending parallel to said bottom members and being substantially shorter than the length of the stack; and means for connecting said bottom members and the ends of said beam, one connection to one end of one bottom member including a manually operable releasing mechanism located adjacent said beam and the other connections being held against manual release during lifting of the load, whereby operation of said releasing mechanism causes a relatively slow discharge and a spreading of the load.

4. A sling for baled hay and the like, including: a pair of spaced apart flexible bottom members adapted to have bales of hay and the like stacked thereon in a generally rectangular stack, said bottom members having a length more than twice that of the stack; a rigid lifting beam extending parallel to said bottom members and having a length between half and three-quarters of that of the stack; and means for connecting said bottom members and the ends of said beam, one connection to one end of one bottom member including a manually operable releasing mechanism located adjacent said beam and the other connections being held against manual release during lifting of the load, whereby operation of said releasing mechanism causes a relatively slow discharge and a spreading of the load.

5. A sling for baled hay and the like, including: a pair of spaced apart flexible bottom members adapted to have bales of hay and the like stacked thereon in a generally rectangular stack, said bottom members having a length more than twice that of the stack and being interconnected by flexible cross-members beneath the stack and beyond the ends of the stack; a rigid lifting beam extending parallel to said bottom members and having a length between half and three-quarters of that of the stack it is adapted to accommodate; and means for connecting said bottom members and the ends of said beam, one connection to one end of one bottom member including a manually operable releasing mechanism and the other connections being held against manual release during lifting of the load.

6. A sling for baled hay, including: a pair of spaced apart flexible bottom members adapted to have a predetermined number of bales of hay stacked thereon to form a generally rectangular stack, said bottom members having a length more than twice that of the stack and being interconnected by flexible cross-members beneath the stack and beyond the ends of the stack; a rigid lifting beam extending parallel to said bottom members and having a length between half and three-quarters of that of the stack it is adapted to accommodate; and means for connecting said bottom members and the ends of said beam, one connection to one end of one bottom member including a manually operable releasing mechanism and the other connections being held against manual release during lifting of the load whereby operation of said releasing mechanism causes a relatively slow discharge and a spreading of the load.

LEE F. O'BRIEN.

REFERENCES CITED

The following references are of record in the file of this patent:

UNITED STATES PATENTS

| Number | Name | Date |
| --- | --- | --- |
| 798,560 | Von Bechtolsheim | Aug. 29, 1905 |
| 1,621,604 | Ruggles | Mar. 22, 1927 |
| 2,431,194 | O'Brien | Nov. 18, 1947 |